United States Patent [19]

Devellian et al.

[11] Patent Number: 4,500,279

[45] Date of Patent: Feb. 19, 1985

[54] HEAT PIPE MANIFOLD SYSTEM

[75] Inventors: Richard D. Devellian, Rockport; Paul M. Swenson, Gloucester, both of Mass.

[73] Assignee: Kona Corporation, Gloucester, Mass.

[21] Appl. No.: 510,440

[22] Filed: Jul. 6, 1983

[51] Int. Cl.³ .............................................. B29F 1/03
[52] U.S. Cl. .................................... 425/548; 249/81; 249/105; 425/572; 425/547; 425/566
[58] Field of Search ............... 425/547, 548, 572, 588, 425/143, 144, 552, 566, 549; 264/328.14, 328.16; 249/79, 81, 105, 110

[56] References Cited

U.S. PATENT DOCUMENTS

| 2,542,263 | 2/1951 | Shultz | 264/328.16 |
| 3,189,948 | 6/1965 | Whitney | 425/548 |
| 3,661,487 | 5/1972 | Susin | 425/548 |
| 3,719,441 | 3/1973 | Spaak et al. | 425/548 |
| 4,003,687 | 1/1977 | Hedin | 249/79 X |
| 4,034,952 | 7/1977 | Stewart | 425/143 X |
| 4,238,181 | 12/1980 | Dannels et al. | 425/548 |
| 4,269,586 | 5/1981 | Ronayne | 249/79 X |
| 4,309,163 | 1/1982 | Cottancin | 425/548 |
| 4,309,379 | 1/1982 | Dannels et al. | 264/328.16 |

Primary Examiner—J. Howard Flint, Jr.
Attorney, Agent, or Firm—David A. Tucker

[57] ABSTRACT

A hot manifold system for use in the injection molding of plastics is disclosed wherein runner channel heating is accomplished by heat pipes disposed within the manifold adjacent to the runner channels contained therein. The manifold system is an elongated structure having a heat receiving portion and a runner containing portion such that heat input may be applied to the heat receiving portion at an accessible location relative to the mold and conveyed to the remainder of the manifold for uniform heating thereof by the heat pipes.

15 Claims, 5 Drawing Figures

HEAT PIPE MANIFOLD SYSTEM

BACKGROUND OF THE INVENTION

1. Field of the Invention

The present invention relates generally to injection molding devices, and more particularly to hot manifolds suitable for use as part of the mold in such devices as a means to maintain the material in the runner channels of the mold in a liquid condition and at a substantially uniform temperature throughout the molding cycle of the injection molding device.

2. Summary of the Prior Art

The concept of a hot manifold is well known in the art of injection molding. Generally speaking, such a manifold represents an extension of the injection unit, adapted to maintain the melt in a liquid state, disposed within the mold, which is otherwise adapted to solidify the melt. In an injection molding device utilizing such a manifold, the melt proceeds from the extruder (or other melt source) through a sprue bushing (generally heated) from which it enters the manifold. Within the manifold, the melt passes through one or more runner channels exiting into one or more feeding channels, which convey it out of the manifold to the cavities (or cavity) of the mold through appropriate bushings or other connecting devices.

As was alluded to above, the purpose of manifolds of this type is to maintain the melt in the runner channels of the mold in a liquid condition at substantially the temperature at which it was extruded, uniformly, and throughout the molding cycle of the device. The accomplishment of this goal provides numerous advantages over the conventional practice wherein both the runners and the desired parts were solidified and ejected during each molding cycle. These advantages include, among others, more automatic operation; the elimination of the handling, regrinding and waste of the solidified runners; operation at lower pressures and temperatures; reduction of required press-plasticating capacity and shorter cycles because only the part must be molded, solidified and ejected during each cycle; and the reduction or elimination of various technical molding, gating, and ejection problems, primarily because the melt is delivered to the cavity at optimum flowability. There are also significant disadvantages and problems with presently available hot manifolds, however, which are primarily related to such factors as the means heretofore utilized to heat such manifolds, the complexity of the design and manufacture of such manifolds, and the inherent necessity of insulating such manifolds from the remainder of the mold in which they are contained.

Of particular importance is the fact that the hot manifold within the mold must be insulated from the cavity containing portion thereof. Air gaps have been found to be both economical and effective for this purpose in that they minimize the effect that the operating temperature of the manifold has upon the cavity portion of the mold and vice versa. The creation of such air gaps, on the other hand, requires the presence of supports between the manifold and the cavity containing portion of the mold which must be strong enough to withstand the clamping tonnage of the press and so designed that the manifold will not be damaged in machine operation. This means in many applications that either a large plurality of supports are needed or pressure pads of fairly large surface area must be utilized. These supports and pressure pads create localized heat sinks which prevent the achievement of a uniform temperature profile throughout the manifold.

When this factor is combined with the need to provide at least one melt channel between the hot manifold and the cooled cavity (ies), it will be understood that the task of heating the manifold uniformly is not an easy one. The prior art has attempted this in numerous ways with varying degrees of success. For example, commercially available cartridge type electrical resistance heaters have been located within the manifold near the runners. Similarly, tubular heaters have been embedded in the manifold block. In each of these alternatives, hot spots and an overall variation in the output temperature of the heater over its length have been noted. Attempts have been made to anticipate the location of such hot spots, the output temperature gradient and the nonuniformity caused by the heat sinking effects of the supports and related structures and to compensate therefor in the construction of the heaters, as by varying the coil density within such heaters along their length. Such attempts are marginally effective at best, and are totally impractical on a production scale due to the inherent variations found from one system to another. Alternatively, electrical resistance type heaters have been disposed within the melt stream contained in the runners either alone or in combination with the heaters located in the manifold block discussed above. Hot spots and a temperature gradient along the length of the heater plus external heat sinking are again significant problems however.

Further, in each of the above attempts at uniform manifold heating of the prior art, one must contend with the facts that each heater must be supplied with a controller and that the heater, controller, and associated electrical wire, must be located at a fairly inaccessible position within the mold. Accordingly, prior hot manifolds are not only complex to design and manufacture, and less than optimum in applied temperature uniformly, thereby causing melt degradation at worst and less than perfect operation at best, but also are inherently hard to mainftain and/or repair. In fact, if one of the above-referred-to resistance heaters fails, the manifold must generally be removed from the mold to replace it. This process is not only complex, expensive and time consuming in terms of disassembly and reassembly of the mold, but also extremely costly in terms of lost production caused by machine down time, wasted operator time and the like.

Additionally, despite the fact that the principals of heat pipe technology and design are, and have been for some years, well known (see for example, *The Heat Pipe* by G. Yale Eastman, Scientific American, May 1968, the disclosures of which are hereby incorporated herein by reference), they have been little used in the injection molding field. Thus, aside from the use of heat pipes to cool (or heat) localized portions of the core portion of the mold (U.S. Pat. No. 4,338,068 for example); the use of a heat pipe to heat the tip of a valve gate device (U.S. Pat. No. 4,125,352); and the use of heat pipes in an injection bushing (U.S. Pat. No. 4,034,952 for example), applicants are not aware of any relevant prior art in this field utilizing heat pipe technology. The reasons for this are not entirely clear, but may reside in the perceived complexity of design and manufacture arising from the fact that injection molding machine parts must be made of high strength steel in order to withstand the high operating pressures present in such devices. The iron in steel is, of course, not compatable with water, the normal operating fluid of a heat pipe (that is, the iron will tend to react with water at the temperatures and pressures of heat pipe operation to release the noncondensible gas hydrogen), thereby requiring not only the plating or coating of the inner walls of the heat pipe with a water compatable material such as copper or nickel, but also the provision of means such as a Monel (a nickel/copper/iron alloy) plate to allow the diffusion of any hydrogen gas created. This is particularly true in light of the ability of the art to "get by" with the use of more conventional electrical resistance heaters until the recent advent of a desire to injection mold plastics which exhibit extremely high thermo-sensitivities, that is plastics which can tolerate only very small temperature variations while passing through the machine in a molten state before they will degrade on the one hand or significantly lose flowability on the other.

SUMMARY OF THE PRESENT INVENTION

It is accordingly an object of the present invention to provide a hot manifold which is heated to a very high degree of uniformity throughout the melt runner portion of the manifold during the complete molding cycle of the machine.

It is also an object of the present invention to provide a hot manifold construction wherein the required heating means, controllers, and related wiring are accessible for maintenance and/or replacement without the need for disassembly of the mold.

Further, it is an object of the present invention to provide a hot manifold possessing sufficient adaptability of design that all desired configurations may be incorporated therein (or therewith) without the necessity of introducing heaters, wires, or controllers inaccessibly within the mold.

To accomplish these and other objectives of the present invention, there is provided a hot manifold generally comprising two portions, namely, a runner containing portion and a portion adapted to receive heat from a heating means. A plurality of substantially tubular heat pipes extend from within the heat receiving portion into the runner containing portion substantially parallel to and uniformly disposed relative to the runners for substantially the entire length thereof. In the preferred embodiments, the manifold is an elongated structure such that the heat receiving portion is accessible from outside the mold while the runner portion remains in the conventional location. In this manner, all heating elements, controllers, wires, and related circuitry are made easily and readily accessible while at the same time manifold operation is improved. This improvement is the result of the fact that heat pipes are not simply devices for the transfer of heat from point A to point B, but are instead essentially isothermal devices which maintain their entire wall area at the vapor equilibrium temperature established at their heat input by variations in the rate of change of state of their operating fluid in response to external heat sinking effects experienced by those walls (i.e., the temperature of the walls of the heat pipe remains essentially isothermal while the rate of evaporation and condensation within the heat pipe varies along its length to compensate for any heat sinks variously placed along its length). Accordingly, the runner portion of the manifold of this invention operates at substantially the temperature of and with the uniformity of the heat source, a substantial improvement over the prior art, wherein the melt must pass directly through a heat receiving portion thereby being subjected to higher than optimum temperatures. We have found band heaters to be suitable as the heat source, and that an extremely stable configuration results when the heat source comprises heat pipes and conventional cartridge heaters disposed in arrays in the heat receiving portion transverse to the heat pipes extending into the runner containing portion to "flatten out" the temperature distribution within the heat receiving portion.

BRIEF DESCRIPTION OF THE DRAWINGS

These and other features, advantages, and objects of the present invention will become apparent to those skilled in the art from the following detailed description of several exemplary preferred embodiments in connection with the drawings thereof in which.

DETAILED DESCRIPTION OF EXEMPLARY EMBODIMENTS

Figure 1:
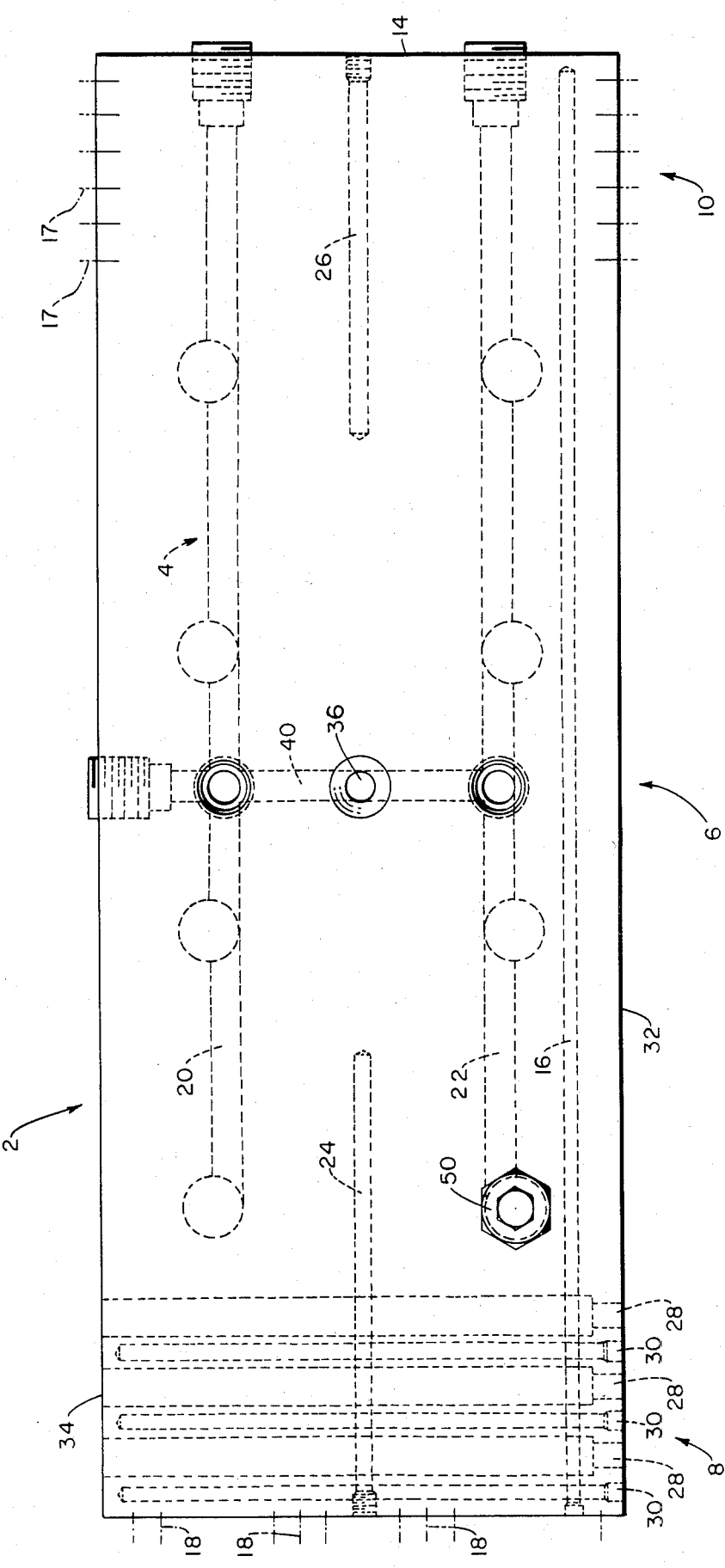
FIG. 1 is a top elevational view of a hot manifold in accordance with the present invention.

Referring now specifically to the drawings (wherein like reference numerals are used to refer to like elements throughout) and particularly to FIG. 1, there is shown a first exemplary embodiment of a hot manifold system in accordance with the present invention. The elongated block generally indicated at 2 may be of substantially any desired shape adequate to contain the runner channels generally indicated at 4 and the required heating means (described below). Normally, this shape will be dictated by mold design constraints for each particular application coupled with the removal of as much extraneous metal as possible to reduce heating requirements. Generally speaking, the block may be considered to have two portions, namely, a runner containing portion generally indicated at 6 and a heat receiving portion (here shown as areas generally indicated at 8 and 10 adjacent left end 12 and right end 14 of block 2 respectively for reasons which will become apparent below).

Figure 2:
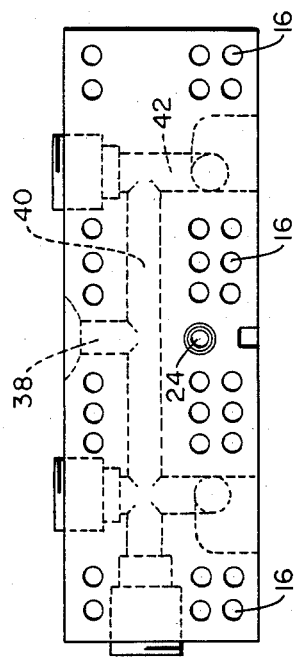
FIG. 2 is a left end elevational view of the hot manifold of FIG. 1.

A plurality of bores 16 (a representative one of which ) is shown in FIG. 1 while the others are indicated by center lines 18) extend from left end 12 substantially all the way through the block 2 to right end 14. As best seen in FIG. 2, the bores 16 are substantially uniformly spaced relative to each other, allowing for the fact that variations in this pattern must be provided to avoid the penetration of the runner channels 4, and are substantially parallel to the major portions 20 and 22 of the runner channel configuration. A substantially centrally located bore 24 also extends perpendicularly into end 12 approximately one quarter of the distance from left end 12 to right end 14, while a similar bore 26 extends a similar distance into end 14. Each bore 16 contains, or itself is made to comprise, a heat pipe, that is a closed, evacuated generally tubular structure lined with capillary means saturated with a volutile fluid, usually water. Bores 24 and 26, on the other hand, contain appropriate control elements such as bayonet type thermocouples.

A plurality of bores 28 and 30 extend from the front 32 substantially to the rear 34 of block 2 in areas 8 and 10. Bores 28 contain conventional cartridge type resistance heaters and bores 30 contain, or themselves are made to comprise, heat pipes.

Otherwise, the construction of the manifold follows conventional practices regarding the design and manufacture of the runner channels 4, the support structures and so on. Thus, the runner channels 4 shown in FIG. 1 are in the basic and conventional H pattern wherein the melt stream enters the manifold at 36 passing downwardly through channel portion 38 to cross channel portion 40 wherein it divides flowing forwardly and rearwardly to major runner portions 20 and 22 and thence downwardly through feeder channels 42 to the cavity portion of the mold. Support ring 44 and dowel pin 46 are indicative of any of a large number of spacing and support means which may be utilized to create an insulating air gap 48 between the manifold and the rest of the mold.

It will accordingly be understood that a manifold is thus provided wherein the heat input may be made readily accessible, very uniform operating temperatures are achievable, and a large array of heretofore unavailable, or at least very complex, design possibilities are readily and comparatively economically available, all as a result of the unique utilization of heat pipe concepts. Thus, while in one sense a heat pipe is a rather simple and useful device for conveying heat from one point to another, it also demonstrates several subtle and remarkable properties. A heat pipe is an essentially isothermal device which operates on the basis of changes in internal pressure and changes of state of its operating fluid in a closed environment. Accordingly, unlike electrical resistance type heaters which rely upon uniformity of coil material and spacing to insure uniformity of temperature along their length, the heat pipe maintains its entire wall area at a constant temperature determined by the equilibrium conditions within it created in response to the hottest temperature to which any portion of its walls is subjected within its designed operating range automatically. This is accomplished without anything but an instantaneous variation no matter what heat sinking conditions those walls may be subjected to by virtue of variations of the rate of change of state of the operating fluid contained within the heat pipe. The heat pipe can thus be used to "flatten out" the temperature variations present in an element in which it is disposed, to transfer heat from a hot area to a cold area, or both at the same time.

Proceeding from these concepts, the operation of a hot manifold in accordance with this invention is readily understood. The purpose is to maintain the melt at the same temperature as it was extruded constantly and uniformly until it passes into the cavities of the mold. One of the best ways to do this is to maintain the manifold at this temperature constantly and uniformly. We do this by constantly and uniformly heating at least one portion of the manifold through which the melt does not pass and then isothermally distributing this heat input throughout the portion of the manifold through which the melt does pass by heat pipes.

The creation of a constant and uniform heat input is achieved in various ways depending upon the particular design criteria involved in the particular application.

Thus, in the embodiment shown in FIG. 1 cartridge type electrical resistance heaters disposed in bores 28 controlled by the thermocouples in bores 24 and 26 provide a heat input whose characteristic gradient along the length of the cartridge heater is flattened by heat pipes in bores 30 thereby providing the desired constant and uniform heat input for the heat pipes in bores 16. In addition, while heat input may be located at one end only, the embodiment of FIG. 1 shows by center lines 17 only for bores comparable to bores 28 and 30, the situation where design considerations and total heat input requirements dictate the need for a second heat input. In such a case, the heat pipes in bores 16 not only distribute the heat from the heat inputs throughout the mold but flatten any temperature gradients present between ends 12 and 14 of block 2. Similarly, block type electrical resistance heaters attached externally above and/or below bores 30 could be used instead of cartridge heaters or the heat receiving portion could be made of rounded cross-section and be heated by an external band heater as in FIG. 4. In the latter case, bores 28 and 30 and their associated thermocouples are unnecessary due to the inherent averaging of the heat input provided by the circular cross-sectional configuration. In any event, the removal of the heat receiving portion from the area of melt flow within the system is deemed to be an important advantage in that as far as possible the temperature of the steel surrounding the runners is constant, rather than high in the area of heat input as in the prior art.

Figure 3:
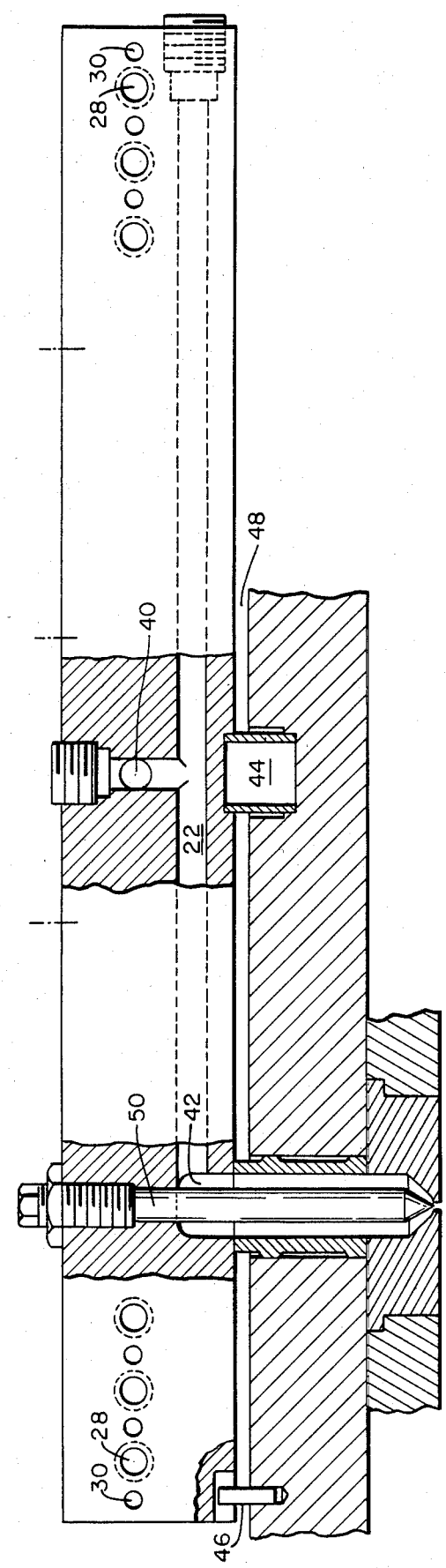
FIG. 3 is a side elevational view in partial section of the hot manifold of FIG. 1 including a heat pipe operated torpedo disposed within the feeder channel.

In addition, the advantages of the present invention relative to the removal of heaters, controllers, and associated wiring from inaccessible locations are not thwarted by the need to provide heated torpedo elements in the feeder channels and/or heated bushings surrounding the feeder channels. Rather, as is representatively shown in FIGS. 1 and 3, a torpedo 50 may extend from within the block 2 into each of the feeder channels 42. Such torpedoes 50 may be fabricated to contain heat pipes in an internal cavity extending from within the manifold substantially the entire length of the torpedo instead of the more conventional cartridge type electrical resistance heater. In this way, not only are wires, controllers and circuitry removed from inaccessible locations but also the torpedo functions better than has been possible for such devices heretofore because the heat pipe within it operates at the uniform temperature of the manifold achieved as above described without hot spots or the temperature gradient along its length inherent in the use of electrical resistance heaters.

Figure 4:
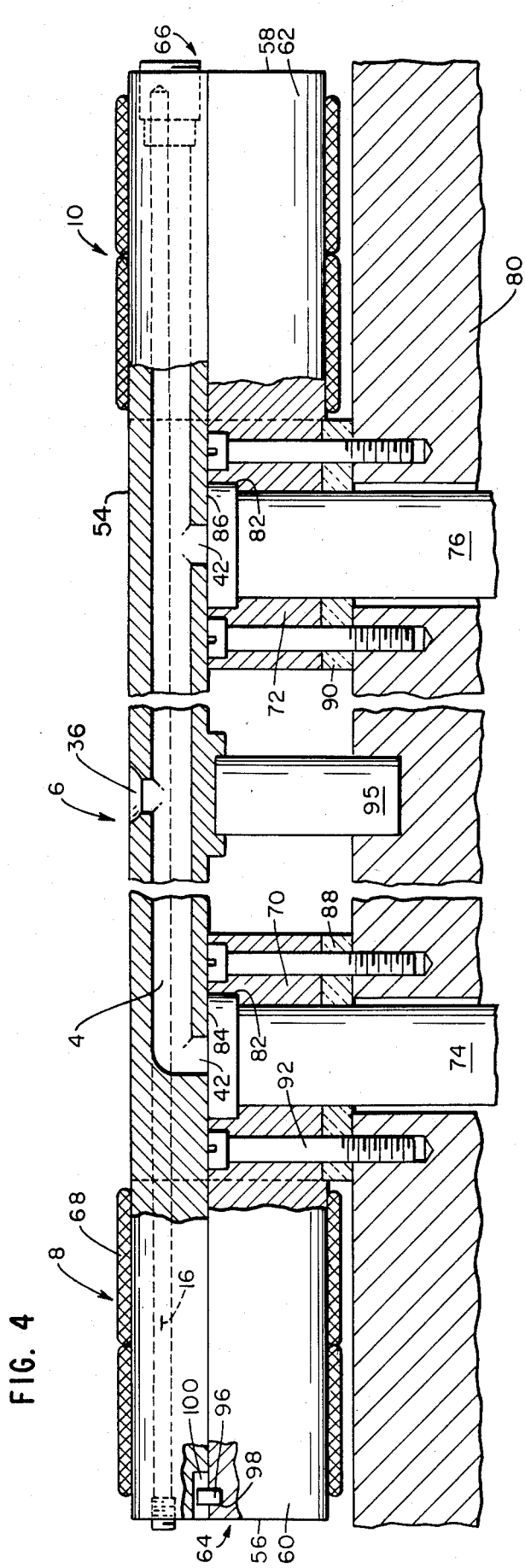
FIG. 4 is a side elevational view in partial section of a second hot manifold in accordance with the present invention including a heat pipe operated feeder channel bushing.
Figure 5:
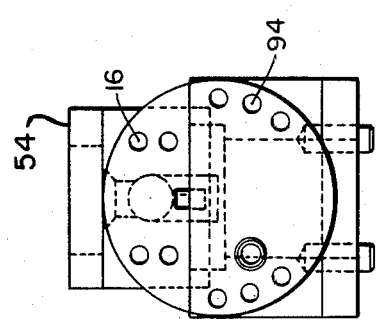
FIG. 5 is a left end elevational view of the manifold of FIG. 4.

FIGS. 4 and 5 show a design of a manifold system in accordance with the present invention wherein the wires, controllers and so on related to the feeder channel bushings are moved from inaccessible locations to accessible ones while at the same time allowing for the inherent thermal expansion of the manifold relative to the cavity portion of the mold. In this particular embodiment, it has been found to be advantageous to manufacture the manifold system in three parts which for convenience may be referred to as the manifold 54 and bushings 56 and 58. The manifold 54 is of the same general construction as that discussed with respect to FIG. 1 with the exception that heat receiving portions 8 and 10 are of generally semi-circular cross-section. The bushing portions 56 and 58, on the other hand, generally comprise heat receiving portions 60 and 62 of generally semi-circular cross-section adapted to mate with sections 8 and 10 of the manifold respectively to form heat receiving portions 64 and 66 for the entire system which are circular in cross-section suitable for heating by external band heaters 68; and feeder channel containing portions 70 and 72, respectively. The feeder channels 74 and 76 in portions 70 and 72 connect the feeder channels 42 of the manifold to the cavity portion 80 of the mold and include a counterbore 82 adjacent the top 84 and 86 of portions 70 and 72. The bushing portions 56 and 58 are separated from cavity portion 80 by insulating gaskets 88 and 90 respectively and are secured thereto by any convenient means such as screws 92. A plurality of heat pipe containing bores 94, similar to bores 16 extend from within heat receiving portions 64 and 66 into feeder channel containing portions 70 and 72 respectively about feeder channels 74 and 76.

In this case then, manifold 54 rests upon bushings 56 and 58, which are secured to cavity portion 80, and upon center support 95, its alignment being determined in any convenient manner here represented by dowel pin 96 set in bore 98 of bushing 56 slidably engaging slot 100 in manifold 54. In operation therefore the manifold 54 and bushings 56 and 58 are heated to the same uniform temperature by the heat pipes therein in response to band heaters 68. The manifold 54, however, is allowed to expand longitudinally while the bushings 56 and 58, which constitute smaller parts less subject to thermal expansion, are fixed to the cavity portion of the mold. In this way, alignment of the feeder channel with the cavity portion of the mold is maintained despite the expansion of the manifold and without the complexities and maintenance problems usually associated with heated bushings which are independently heated yet must be in balance temperature-wise with the manifold.

It is to be understood that the structures described above and shown in the drawings represent only a few of the possible embodiments of the present invention and that various modifications thereof, or even alternative designs, may be made within the scope of the appended claims. For example, and in no way as a limitation, in the embodiments shown the heat pipe containing bores 16 may be replaced by heat pipe containing bores extending from each end of the manifold substantially to the plane parallel to the ends which contains entry channel 38. This alternative reduces the flattening effect achieved by interconnection of heat receiving portions 8 and 10 but allows a portion of the manifold to be effectively shut off while the remainder thereof remains operational. Similarly, the runner channels need not be disposed in the same plane. Thus, a modification of the conventional H pattern may be formed by two elongated blocks in accordance with the above containing the major runners interconnected by a third block containing the cross channel and input channel surrounded by a plurality of heat pipes such that the ends of the third block rest upon and derive their heat for operation from the two elongated blocks. Further, it is to be understood that the claimed structure is useful for both thermosetting plastics and thermoplastics. Various other modifications will undoubtedly suggest themselves to those skilled in the art within the spirit and scope of the present invention.

We therefore claim:

1. A hot manifold system for use between the melt input and the cavity portion of a hot runner mold comprising:
   (a) an elongated block member having a top, a bottom, a left end and a right end;
   (b) a first portion of said block defining within part thereof a runner channel through which molten material is adapted to flow, said runner channel extending from said melt input in the top of said block therethrough to at least one output in the bottom of said block to the cavity portion of said mold;
   (c) a second portion of said block adjacent one end thereof;
   (d) a heat source in direct thermal contact with said second portion;
   (e) a first plurality of elongated isothermal heat pipes disposed within said block;
   (f) said heat pipes extending from within said second portion of said block into said first portion of said block the left to right length thereof such that said heat pipes are substantially uniformly disposed within said first portion of said block relative to each other in proximate relation to said runner channel;
   (g) whereby the temperature of said block may be maintained at a uniform level regardless of factors tending to vary such uniformity by the self compensating variation in the rate of change of state of the operating fluid contained in said heat pipes.

2. The hot manifold system of claim 1 including a third portion adjacent the end of said block opposite to the end thereof to which said second portion is adjacent and a second heat source in direct thermal contact with said third portion wherein said heat pipes extend from within said second portion through said first portion into said third portion.

3. The hot manifold system of claim 1 including a third portion adjacent the other end of said block, a second heat source in direct thermal contact with said third portion, and a second plurality of elongated isothermal heat pipes disposed within said block extending from within said third portion of said block into said first portion of said block the right to left length thereof; said second plurality of heat pipes being uniformly disposed within said first portion relative to each other and said first plurality of heat pipes and being in proximate relation to said runner channel.

4. The hot manifold system of claim 3 wherein said first and second pluralities of heat pipes extend into said first portion from said second and third portions of said block respectively only substantially as far as said melt input.

5. The hot manifold system of claim 1 including an elongated probe portion extending from said first portion downwardly through the middle of each output to said cavity, and an elongated isothermal heat pipe extending from within said first portion centrally into said probe portion substantially the entire length thereof.

6. The hot manifold system of claim 2 including an elongated probe portion extending from said first portion downwardly through the middle of each output to said cavity, and an elongated isothermal heat pipe extending from within said first portion centrally into said probe portion substantially the entire length thereof.

7. The hot manifold system of claim 3 including an elongated probe portion extending from said first portion downwardly through the middle of each output to said cavity, and an elongated isothermal heat pipe extending from within said first portion centrally into said probe portion substantially the entire length thereof.

8. The hot manifold system of claim 4 including an elongated probe portion extending from said first portion downwardly through the middle of each output to said cavity, and an elongated isothermal heat pipe extending from within said first portion centrally into said probe portion substantially the entire length thereof.

9. The hot manifold system of claim 1 wherein said heat source comprises at least one generally tubular electrical resistance type heating means and at least one isothermal heat pipe parallel to said tubular electrical resistance type heating means and wherein said heat source is disposed within said second portion of said block in proximate relation to the first plurality of heat pipes.

10. The hot manifold system of claim 2 wherein said first and said second heat sources respectively comprise at least one generally tubular electrical resistance type heating means and at least one isothermal heat pipe parallel to said tubular electrical resistance type heating means and wherein said heat sources are disposed within said first and said second portion of said block respectively in proximate relation to the first plurality of heat pipes.

11. The hot manifold system of claim 3 wherein said first and said second heat sources respectively comprise at least one generally tubular electrical resistance type heating means and at least one isothermal heat pipe parallel to said tubular electric resistance type heating means and wherein said heat sources are disposed within said first and said second portion of said block respectively in proximate relation to the first and second plurality of heat pipes respectively.

12. The hot manifold system of claim 1 wherein the output in the bottom of the block to the cavity portion of the mold comprises at least one bushing, which bushing comprises a heat receiving portion adapted to receive heat input from at least one heat source associated with said block, and a portion defining a feeder channel connecting the runner channel to the cavity portion of the mold wherein isothermal heat pipes extend from within the heat receiving portion into the feeder channel containing portion in proximity with said feeder channel such that the melt passing through the feeder channels is maintained at the same temperature as the melt passing through the runner channels.

13. The hot manifold system of claim 2 wherein output in the bottom of the block to the cavity portion of the mold comprises at least one bushing, which bushing comprises a heat receiving portion adapted to receive heat input from at least one heat source associated with said block, and a portion defining a feeder channel connecting the runner channel to the cavity portion of the mold wherein isothermal heat pipes extend from within the heat receiving portion into the feeder channel containing portion in proximity with said feeder channel such that the melt passing through the feeder channels is maintained at the same temperature as the melt passing through the runner channels.

14. The hot manifold system of claim 3 wherein the output in the bottom of the block to the cavity portion of the mold comprises at least one bushing, which bushing comprises a heat receiving portion adapted to receive heat input from at least one heat source associated with said block, and a portion defining a feeder channel connecting the runner channel to the cavity portion of the mold wherein isothermal heat pipes extend from within the heat receiving portion into the feeder channel containing portion in proximity with said feeder channel such that the melt passing through the feeder channels is maintained at the same temperature as the melt passing through the runner channels.

15. The hot manifold system of claim 4 wherein the output in the bottom of the block to the cavity portion of the mold comprises at least one bushing, which bushing comprises a heat receiving portion adapted to receive heat input from at least one heat source associated with said block, and a portion defining a feeder channel connecting the runner channel to the cavity portion of the mold wherein isothermal heat pipes extend from within the heat receiving portion into the feeder channel containing portion in proximity with said feeder channel such that the melt passing through the feeder channels is maintained at the same temperature as the melt passing through the runner channels.

* * * * *